Oct. 27, 1942.  J. R. EASH  2,300,282
SCALE
Filed Aug. 20, 1938  3 Sheets-Sheet 2

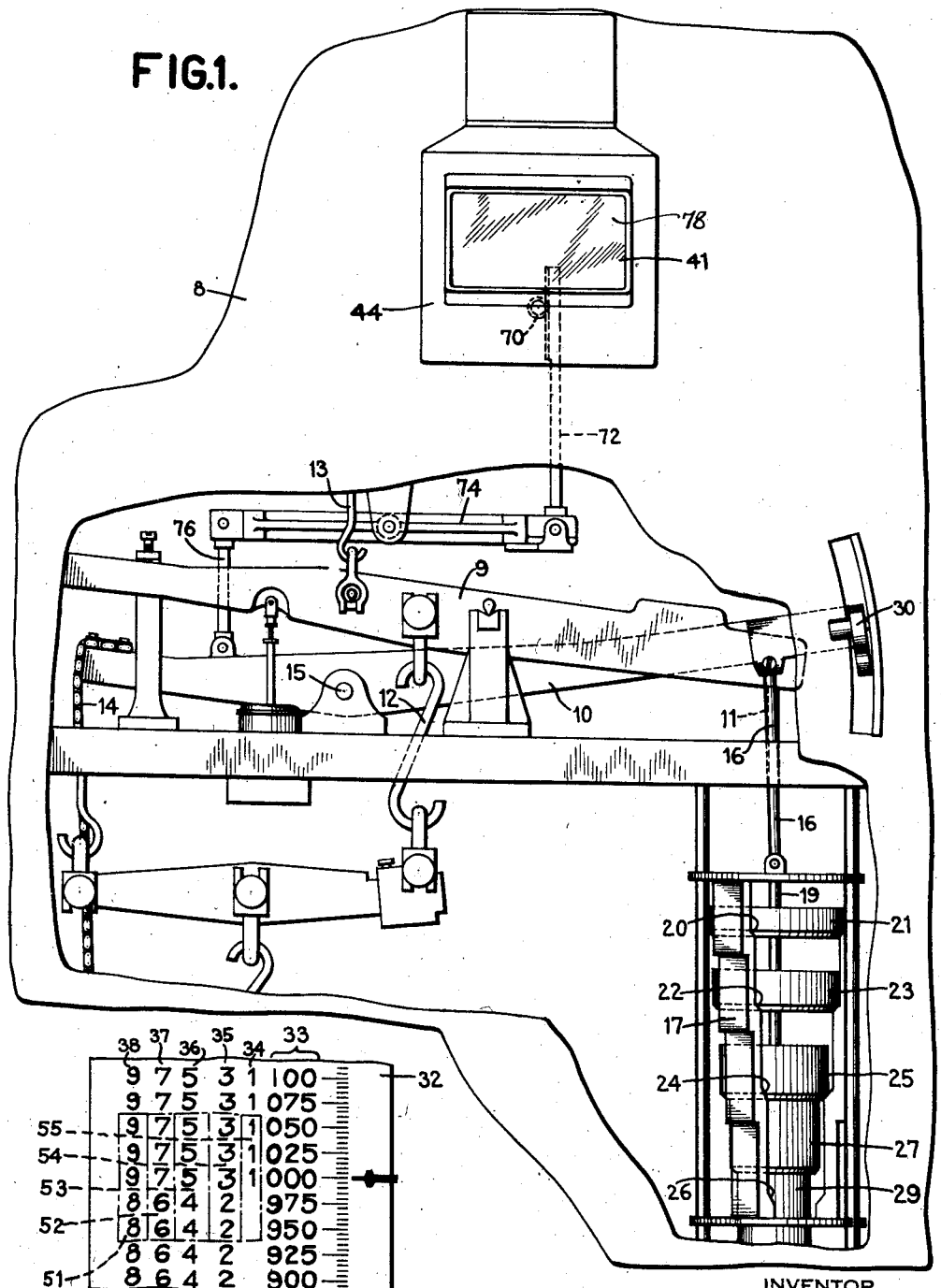

INVENTOR
JOHN R. EASH
BY
Alton and Griswold
ATTORNEYS

Oct. 27, 1942.  J. R. EASH  2,300,282
SCALE
Filed Aug. 20, 1938  3 Sheets-Sheet 3
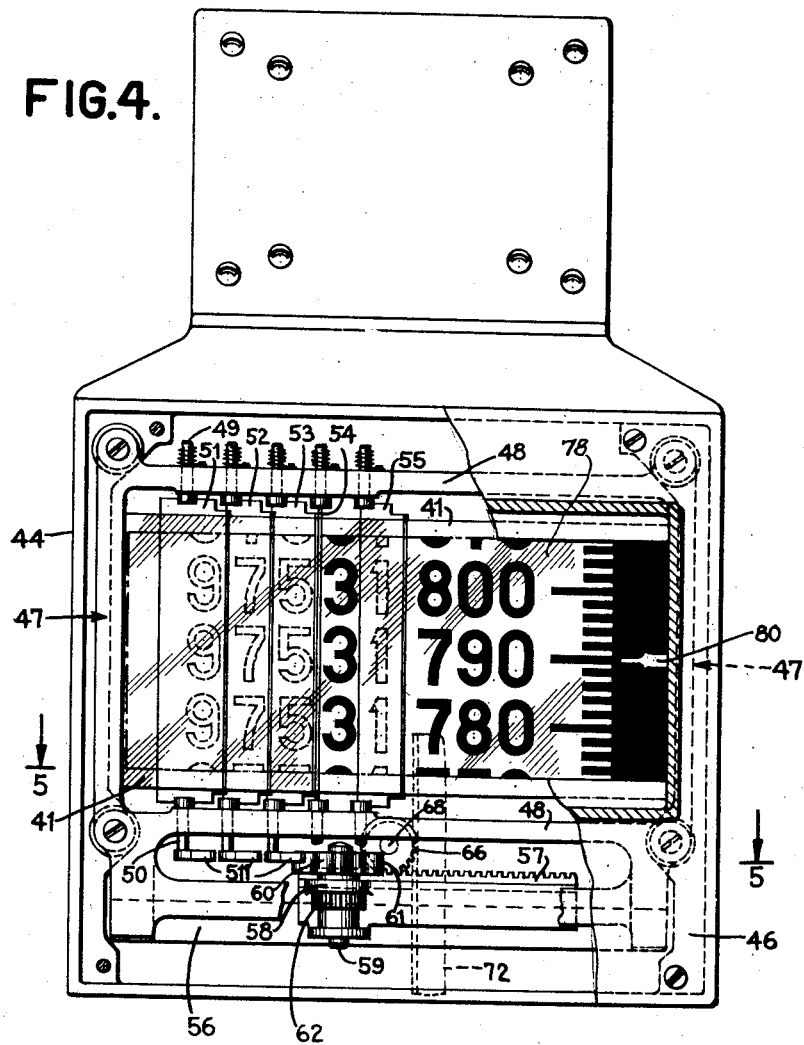
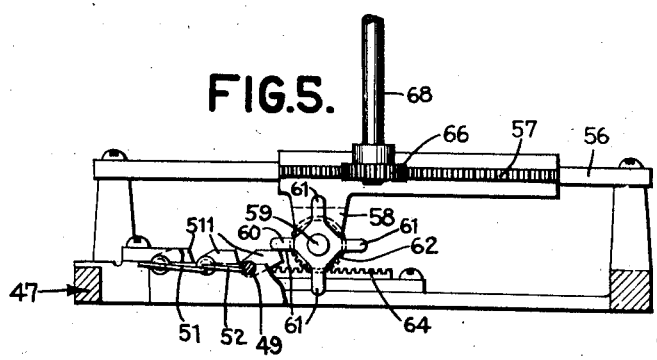
INVENTOR
JOHN R. EASH
BY
Ayton and Griswold
ATTORNEYS Patented Oct. 27, 1942

2,300,282

UNITED STATES PATENT OFFICE 2,300,282

SCALE

John R. Eash, Rutland, Vt., assignor to The Howe Scale Company, Rutland, Vt., a corporation of Vermont Application August 20, 1938, Serial No. 225,846

5 Claims. (Cl. 265—48)

This invention relates to weighing scales and more particularly to weighing scales of the type which normally weigh and give weight indications to a given capacity, but in which it is possible to add one or more equal weights, seriatim, to some point in the lever or weighing mechanism, which weights are each equivalent to the capacity of the weight self-indicating mechanism, i. e., a dial and pointer, and thus multiply the capacity of the scale by as many times as a weight is added. Such scales have had the disadvantage that it is necessary to indicate, in some way, the amount of additional capacity that has been added to that of the self-indicating mechanism so that the total weight of the load can be ascertained. This has usually been accomplished by indicating, at some point, the amount of weight represented by the number of such weights added. This indication had then to be mentally added to the result indicated on the self-indicating mechanism to obtain the total weight of the load. Scales of this type are variously called "multiple weight"; "drop weight"; "unit weight" and "auxiliary weight" scales. Their method of weighing is slow and inconvenient and lends itself to errors in reading and computing or adding the indications of the two weights which were shown at two remote points.

The primary object of the present invention is to provide a weighing scale of the character described in which the weight commonly shown by the self-indicating device and also any so-called increment is displayed at one point.

Another object of this invention is to display both such weights aforesaid as a member representing the sum thereof.

A further object of the invention is to automatically add to the weight indication the increment or increments so that a single reading may be obtained giving the weight of the load on the scale.

It is also an object of the invention to provide self-indicating mechanism capable of displaying the weight of the greatest load which the scale is capable of weighing but which at the same time is capable of distinguishing between the capacity of the self-indicating mechanism and the capacity of the weighing mechanism as additional increments of weight are added.

Another object of the invention is a scale which automatically increases the range of the weight indicating mechanism as increments of weight are added.

The invention also seeks scale mechanism of the character described which is practical from the standpoint of simplicity of manufacture and application and convenience and practicability in use.

In carrying the invention into effect, in the preferred embodiment, the self-indicating mechanism takes the form of a dial or chart movable past an index in proportion to the load on the scale and displaying a column of figures representing the successive weights of the normal capacity of the scale. Also, the dial or chart displays additional columns of figures, each additional column of figures corresponding, in succession, with one of the weights added. Shutters are placed in position to obscure or make visible the successive columns of figures as the corresponding increments of weight are added and these shutters are preferably automatically actuated with the addition or removal of the successive increments of weight.

In the illustrated embodiment, the dial or chart is transparent and the figures and graduations are in contrasting color, so that when a light is focused through the chart, as by a lens system, the image or reflection of the figures and graduations is thrown on a screen, areas of which are controlled by shutters, to be easily read by the observer.

These and other objects of the invention, and the means for their attainment, will be more apparent from the following detailed description, taken in connection with the accompanying drawings, illustrating one embodiment by which the invention may be realized, and in which:

Figure 1 is a view in front elevation showing the beam lever and counterpoise arm of a weighing scale together with the drop weight mechanism and self-indicating mechanism, other parts of the scale being omitted in the interest of clearness;

Figure 2 is a view showing a fragmentary portion of the transparent chart;

Figure 4 is a view showing, in front elevation, shutter and shutter actuating mechanism; and Figure 5 is a view in transverse section, taken in the plane indicated by the line 5—5 of Figure 4 and looking in the direction of the arrows.

Figure 3:
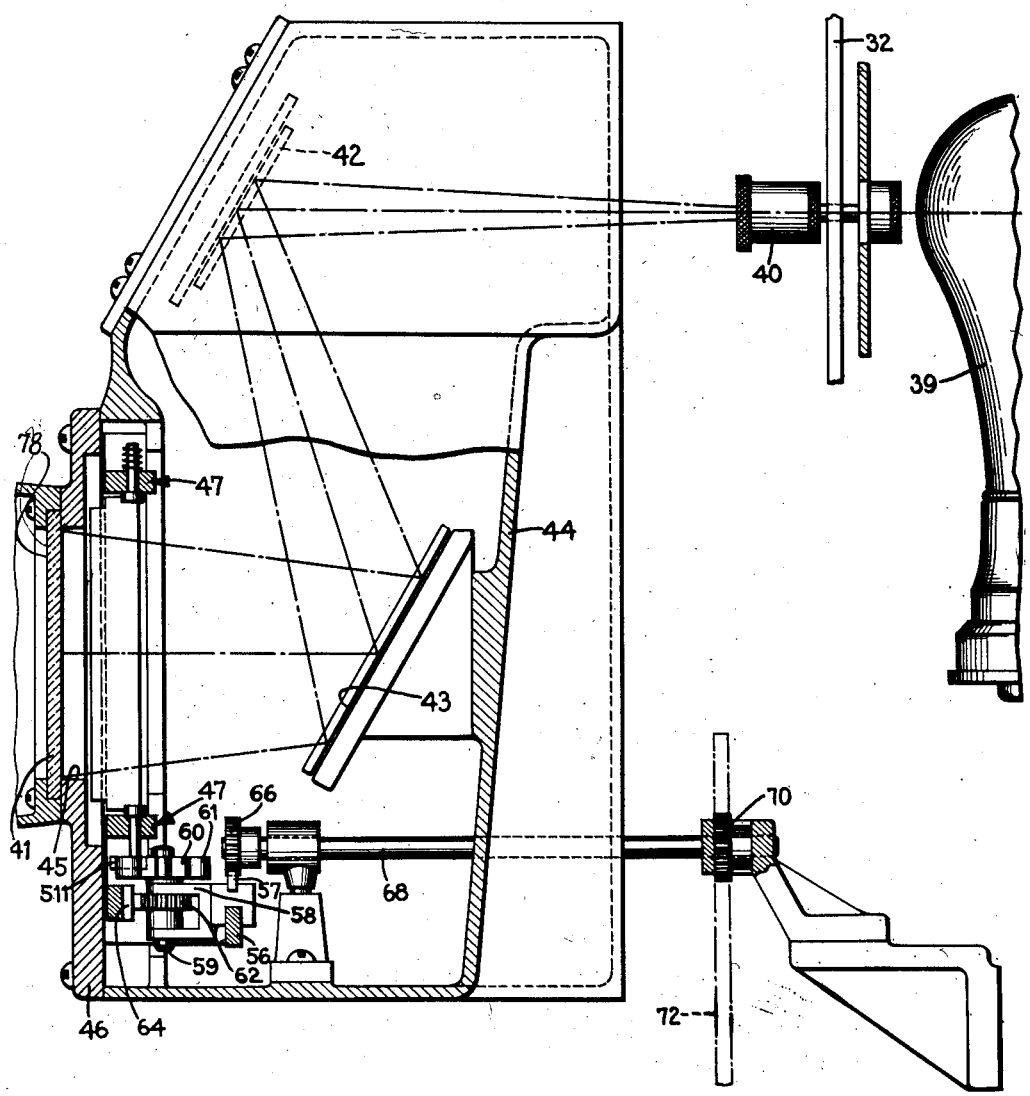
Figure 3 is a view, partly in transverse section, showing the dial or chart, the shutters and actuating mechanism therefor and their associated parts.

Referring first to Figure 1, the front wall 8 of the housing of the weighing mechanism is broken away to illustrate the beam lever 9 of the scale which is representative of any weight moved element of a weighing scale connected, as by the rod 12, to, say, the platform lever system, as will be understood.

The beam 9 is also connected, as by rod 13, to a flexible band, for instance, passing over a cam on a counter-weighted shaft carrying a transparent chart forming the weight self-indicating mechanism. A chart of this general character and its connection with the beam lever, are not illustrated, since, except for the indicia, they are shown, described and claimed in United States Patent No. 1,357,731.

Referring to Figure 1 and assuming, for the sake of illustrating what is meant by a "drop weight" scale, that the normal capacity of the self-indicating mechanism, such as the chart, is 2000 pounds, but a total capacity of 10,000 pounds is desired, the additional 8000 pounds capacity is obtained by adding or applying factored combinations of weights, in succession, in this instance, four increments of weight, or counterpoise weights 21, 23, 25 and 27, each equivalent to the load offsetting value of 2000 pounds load on the platform, to a counterpoise 29 carried on the end of a link 11 suspended from the end of the shelf or beam lever 9, as will be understood. The weights 21, 23, 25, 27 are added, in this instance, through the instrumentality of a manually operated arm 10 which is lowered a given distance for each weight added. Of course, releasable latching devices are commonly provided to retain the arm 10 in the selected position.

The counterpoise arm 10 is fulcrumed at 15. It is connected at one end as by flexible link 14 with a counterweight, not shown. It carries, by link 16, a frame 17 formed with a series of vertically spaced counterpoise carrying shoulders 20, 22, 24 and 26 respectively adapted to carry the counterpoises 21, 23, 25 and 27, the rod 11 being the counterpoise rod of the scale beam 9 by which the counterpoise weight 29 is suspended, as will be understood.

An operating handle for the counterpoise arm 10 is indicated at 30 by which the arm 10 may be moved about its pivot in a clockwise direction from one latching point to the next to apply, seriatim, the counterweights to the counterpoise 29 as will be understood, whereby the capacity of the scale is multiplied by as many times as a counterweight is added. For instance, when the rod 16 is lowered, the shoulder 26 is moved below the top of counterpoise 29 so that weight 27 rests and is supported on weight 29 and its weight added thereto. All of the shoulders 20, 22, 24, etc. are similarly so spaced that one weight at a time is superimposed on the weight below as the lever 10 is moved to successively lower positions.

Referring now to Figure 2, a fragmentary part of a transparent chart is indicated at 32. This chart serves as the self-indicating mechanism and is preferably formed of transparent material and has depicted thereon a column of figures 33 from 000 to 999 and repeated twice increasing in increments of five, in this instance, and a column 34 for figures 34 to appear in front of the figures in column 33. That is before the first group of figures from 000 to 975 no numeral appears in column 34 since the weight indications read from no pounds weight to 975 pounds weight and these are the normal capacity digits. Above that normal capacity of 999 pounds, column 34 is formed of the numerals or digits representing the load offsetting value of the applied weight 27 so as to give readings between 1000 and 1999. These represent the successive weights within the normal capacity of the scale, all as shown in the patent aforesaid. Column 35 contains a series of numerals "2" opposite the first group of numerals 000 to 975 in column 33 and a series of numerals "3" above that and so on. Light from the light source 39 (Figure 3) is concentrated on the chart and the image of the figures so illuminated is thrown, as by a lens system 40, on a screen 41, it being understood that mirrors or reflecting prisms 42, 43 change the direction of the path of light as required. The parts so described are contained within a housing 44 suitably mounted on the scale and the screen 41 closes an opening 45 in the front face thereof and is visible to the operator of the weighing mechanism.

For convenience in manufacture, the opening 45 is preferably formed in a closure member 46 for the open front of the housing 44. Mounted within the front opening is a rectangular frame member 47 having spaced horizontal bearing members 48 in which are journalled the pintles 49, 50 of a series of shutters 51, 52, 53, 54, 55, one for each column of numerals 34, 35, 36, 37, and 38. On the lower end of each pintle 50 is an arm 511. Secured to the upper pintle 49 is a spring controlling the position of the shutter.

Below the lower bearing 48 and parallel thereto is a track 56 on which is adapted to reciprocate a rack 57. Rack 57 carries an arm 58 in which is journalled a shaft 59 having at its upper end a star wheel 60 provided with as many points 61 as is necessary to engage seriatim the operating arms 51 of the respective shutters. On the lower end of the shaft 59 is a pinion 62 adapted to engage and travel over a fixed rack 64 conveniently carried by the front closure 46 of the housing 44. The reciprocating rack 57 is actuated by a relatively fixed pinion 66 carried on the shaft 68 suitably journalled on the apparatus. A second pinion 70 on the shaft 68 is in mesh with a vertical rack 72 connected to one end of a lever 74 (Figure 1), the other end of which is connected as by link 76 with the counterpoise arm 10.

Thus when the counterpoise is lowered to add one or more weights to the beam lever, the rack operating lever 74 is rocked in a clockwise direction, as viewed in Figure 1, thus drawing the rack 72 downwardly and rotating the pinions 70 and 66 which in turn advance the rack 57 to the left, as viewed in Figure 4, thereby causing the star wheel 60 to advance and rotate through the angle necessary to open one of the shutters and uncover the row of figures corresponding to the sum of counterpoise weights that have been added to the beam lever.

Assuming, by way of illustration, that the normal capacity of the scale and of the chart is 2000 pounds, weighing within this limit is obtained when the counterpoise 29 is on the beam lever and the weight of loads within this limit is displayed through that portion of the opening to the right of the shutters 52, 53, 54 and 55 as viewed in Figure 4 and with the shutter 54 open to uncover column 35. For instance, if the load weighed seven hundred ninety pounds, the image of the figure 790 would appear opposite the index 80. If the load weighed one thousand nine hundred fifty pounds, let us say, a numeral "one" in column 34 would be displayed by the open shutter 55 and the balance of "950" would appear in the normally open space 78. Provision is made, however, for a total capacity of 10,000 pounds, the additional 8000 pounds being obtained by adding, in succession, four increments of weight, each equivalent to 2000 pounds on the platform, to a counterpoise on the shelf or beam lever 9. It is to be understood that the weights may be added in any convenient manner although in this instance through the medium of a manually operated arm 10 which is lowered a given distance for each weight added.

It will be recalled that the capacity of the self-indicating mechanism has been assumed to be 2000 pounds. The column 33 of the figure on the chart 32 in conjunction with a numeral "1" in column 34 thus gives readings showing the load on the scale from 0 to 1999. The figures in column 33 are visible at all times in the opening 78 of the window 41 which opening is not controlled by shutters. Column 34, of course, in its lowermost portion, contains no numeral since the weight indication does not exceed, for instance, 995 pounds. Beyond 999 pounds, of course, numeral 1 appears in the column 34 in line with all indicated weights above 999 pounds and this combined column 34 and 33 gives a total reading of 1,999 pounds. Assuming now that a load is to be weighed in excess of 1,999 pounds or, let us say, 3,250 pounds: Column 35 contains numerals 2 and 3, and it is contemplated, as an additional counterpoise is added, that the shutter 51 be closed automatically to hide the blank space and the numerals 1 in column 34, while the shutter 54 will be opened to expose the column 35 in which the numerals "3" appear. Similarly the column 36 contains the numerals 4 and 5, which will be uncovered by shutter 53, the column 37 contains the numerals 6 and 7 which will be uncovered by shutter 52 and the column 38 contains the numerals 8 and 9 which will be uncovered by shutter 51. Each of these shutters thus corresponds in succession to one of the counterpoise weights added and to one of the column of figures. The shutters, the columns of figures and the weights move in unison as the weighman adds capacity to the scale, and all of the columns of numerals are hidden from view except the one corresponding to the sum of the counterpoises added to the beam 9. In its normal position at zero or empty balance, only the units, tens and hundreds columns of figures, i. e., the column 33, is in view on the reading scale. However, as weight is added up to 1000 pounds, the thousands column also comes into view, and this column 34 remains in view up to 2000 pounds which is the capacity of the chart when used without additional increments of weight. Assuming now that a load is to be weighed in excess of 2000 pounds and not more than 4000 pounds; the weigh man lowers the weight operating arm 10 one step thereby lowering the frame 17 and adding the weight, say, 27, to the counterpoise 29. At the same time the shutters are actuated, because the movement of the counterpoise arm 10 in a clockwise direction, as viewed in Figure 1, moves the link 76 upwardly and rocks lever 74 about its pivot, also in a clockwise direction, and thereby rotates the pinion 66 and progresses the slide 57 along the front of the casing. Thereby is one of the arms 61 engaged and moved. The arm 61 is on the shutter wheel 60 and moves the shutter 51 to closed position to hide the figures in column 34 and the arm on shutter 52 is also moved to swing that shutter open to expose the numbers in column 35.

It will thus be seen that self-indicating mechanism is provided for a weighing scale of the type in which the capacity of the scale may be increased by regular increments equal to the normal or indicatable capacity of the scale and such increments are automatically indicated by or added to the weight indicated so that the true weight may be read at a glance.

Various modifications will occur to those skilled in the art in the type of scales to which the invention is applied as well as to the characteristics of the self-indicating mechanism and the means for adding increments of weight to the lever system as well as in the method of automatically portraying the load including the increments thereof and no limitation is intended by the phraseology of the foregoing description or illustrations in the accompanying drawings except as indicated in the appended claims.

What is claimed is:

1. In a scale of the so-called drop weight type, in combination, a beam lever the movement of which is proportional to the load on the scale, a counterpoise operatively connected to said beam lever, a plurality of weights, means to support said weights independently of said counterpoise, a weight manipulating arm connected to said supporting means, self-indicating means comprising a chart, a multiplicity of columns of indicia thereon, said chart and indicia being of relatively different transparency, a light source, means for projecting said light onto or through said chart and onto a screen, a plurality of shutters respectively masking the images or reflections of the columns of indicia, respectively, and means operatively connected to said weight manipulating arm to successively vary the position of said shutters as successive weights are transferred from said supporting means to said counterpoise.

2. In a weighing scale of the drop weight type having a counterpoise, in combination, self-indicating mechanism comprising a column of indicia denoting a predetermined weighing capacity, and additional columns of indicia denoting additional capacity, means to add increments of weight to said counterpoise, means to selectively mask and unmask selected columns of indicia comprising a frame, a plurality of shutters pivoted in the frame, each of said shutters having an operating arm, a fixed rack, a slide movable with respect thereto by the increment adding means, a star wheel the arms of which are adapted to engage the shutter arms and a pinion to rotate the star wheel and meshing with the fixed rack.

3. In a scale of the so-called drop weight type, in combination, a beam lever the movement of which is proportional to the load on the scale, a counterpoise operatively connected to said beam lever, a plurality of weights, means to support said weights independently of said counterpoise, a weight manipulating arm connected to said supporting means, means to add increments of weight to said counterpoise, means to selectively mask and unmask selected columns of indicia comprising a frame, a plurality of shutters pivoted in the frame, each of said shutters having an operating arm, a fixed rack, a slide movable with respect thereto by the weight manipulating arm, a star wheel the arms of which are adapted to engage the shutter arms and a pinion to rotate the star wheel and meshing with the fixed rack.

4. A weighing scale including a weight moved element, means for applying factored combinations of weights thereto, an indicating chart, means for differentially displacing the same in accordance with the various load offsetting values of one or a plurality of spplied weights, said indicating chart having a plurality of relatively adjacent columns of digits, said digits in the respective columns being arranged in transverse rows, each transverse row comprising digits representing loads within the normal capacity of the scale and other digits which, when respectively read therewith, represent the respective load offsetting values of applied weights, the digits representing the normal capacity of the scale being permanently exposed to view, means normally concealing, respectively, each column of digits representing the load offsetting values of the applied weights, operative connections between the aforesaid means for applying factored combinations of weights to the weight moved element and said concealing means whereby concealing means are automatically operated to expose a selected column of digits representing the load offsetting value of the applied weight to permit such digits to be read with the normal capacity digits as a complete number to give the weight of the load.

5. A weighing scale including a weight moved element, means for applying factored combinations of weights thereto, an indicating chart, means for differentially displacing the same in accordance with the various load offsetting values of one or a plurality of applied weights, said indicating chart having a plurality of relatively adjacent columns of digits, said digits in the respective columns being arranged in transverse rows, each transverse row comprising digits representing loads within the normal capacity of the scale and other digits which, when respectively read therewith, represent the respective load offsetting values of applied weights, the digits representing the normal capacity of the scale being permanently exposed to view, shutter means adapted, respectively, to conceal each column of digits representing the load offsetting values of the applied weights, means supporting said shutter means for movement between a position concealing the respective columns and a position exposing the respective columns, operative connections between the aforesaid means for applying factored combinations of weights to the weight moved element and said shutter means whereby said shutter means are selectively moved to expose a selected column of digits representing the load offsetting value of the applied weight to permit such digits to be read with the normal capacity digits as a complete number to give the weight of the load.

JOHN R. EASH.